United States Patent [19]
Hackett

[11] Patent Number: 5,327,015
[45] Date of Patent: Jul. 5, 1994

[54] SUPERCONDUCTOR DEVICE TO PRODUCE ELECTRICAL IMPULSES

[75] Inventor: Kirk E. Hackett, Beaconsfield, United Kingdom

[73] Assignee: The United States of America as represented by the Secretary of the Air Force, Washington, D.C.

[21] Appl. No.: 848,566

[22] Filed: Mar. 9, 1992

[51] Int. Cl.$^5$ ............................................. H01H 47/00
[52] U.S. Cl. ..................... 505/211; 361/141; 322/2 R; 307/106
[58] Field of Search ............... 307/260, 245, 277, 106, 307/306, 462; 505/1, 813, 830, 851, 853, 856, 866, 867; 428/623; 209/155, 209; 323/360; 336/DIG. 1; 361/19, 141; 335/216; 338/325

[56] References Cited
U.S. PATENT DOCUMENTS

| | | | |
|---|---|---|---|
| 4,176,291 | 11/1979 | Rabinowitz | 310/52 |
| 4,190,817 | 2/1980 | Rabinowitz | 335/216 |
| 4,641,104 | 2/1987 | Blosser et al. | 328/234 |
| 4,975,669 | 12/1990 | Wojtowicz | 335/216 |
| 4,999,322 | 3/1991 | Reick | 501/83 |
| 5,011,821 | 4/1991 | McCullough | 505/1 |
| 5,026,681 | 6/1991 | Hed | 505/1 |

Primary Examiner—Jeffrey A. Gaffin
Assistant Examiner—Aditya Krishnan
Attorney, Agent, or Firm—Donald J. Singer; Stanton E. Collier

[57] ABSTRACT

An apparatus for producing an electrical impulse comprising a tube made of superconducting material; a source of magnetic flux is mounted about one end of the tube; a means for intercepting the flux is mounted along the tube; and a means for changing the temperature of the superconductor is mounted about the tube. As the tube is progressively made superconducting, the magnetic field is trapped within the tube and in so doing creates an electrical impulse in the means for intercepting. A reversal of the superconducting state produces a second pulse.

9 Claims, 1 Drawing Sheet

SUPERCONDUCTOR DEVICE TO PRODUCE ELECTRICAL IMPULSES

STATEMENT OF GOVERNMENT INTEREST

The invention described herein may be manufactured and used by or for the Government for governmental purposes without the payment of any royalty thereon.

BACKGROUND OF THE INVENTION

The present invention relates to superconducting devices, and, in particular, relates to superconducting devices for producing electrical energy.

U.S. Pat. Nos. 5,011,821; 4,999,322; 4,975,699 and 5,026,681 are incorporated by reference.

It is well known that an electromagnetic force or voltage is induced in a conducting loop or coil when there is relative motion between the conducting loop and a magnetic field. Thus, the production of electric power by electromagnetic means requires that a conductor(s) be in a changing magnetic field.

As regards to superconducting materials, the Meissner effect is the expulsion of magnetic flux from the interior of a piece of superconducting material as the material undergoes the transition to the superconducting phase. Under controlled conditions, the Meissner effect is reversible in the presence of a magnetic field. In the presence of a magnetic field, with the temperature of the superconducting material above the critical temperature, the field freely penetrates the superconductive material. As the temperature drops below the critical temperature, the superconductive material transitions into the superconducting state and expels the magnetic field.

As the temperature rises above the critical temperature, the superconducting material transitions back to the normal state and the magnetic field returns to penetrate the superconducting material volume.

SUMMARY OF THE INVENTION

The present invention comprises a hollow tube made of superconducting material. About an end of the tube is placed a source of magnetic fields and therefrom on the tube is placed thereabouts a coil of conductors for outputting an induced voltage. In order to change the tube from a nonsuperconducting state to a superconducting state, a thermal control means is placed in contact with the tube in a desired manner.

In operation, a portion of the magnetic field penetrates the tube when not superconducting. As the temperature of the tube is lowered below the critical temperature, starting at the end with the source of magnetic field thereon the magnetic field is moved from the superconducting portion to the nonsuperconducting portion and in so doing, forces the magnetic field to pass through the coil producing a voltage therefrom. A reversal of the above, also causes a voltage output.

Therefore, one object of the present invention is to provide a superconducting device able to produce an electrical pulse.

Another object of the present invention is to provide a superconducting device that converts changing temperatures into electrical power.

Another object of the present invention is to provide a superconducting device able to generate electrical power without moving parts.

These and many other objects and advantages of the present invention will be readily apparent to one skilled in the pertinent art from the following detailed description of a preferred embodiment of the invention and the related drawings.

DESCRIPTION OF A PREFERRED EMBODIMENT

Figure 1A:
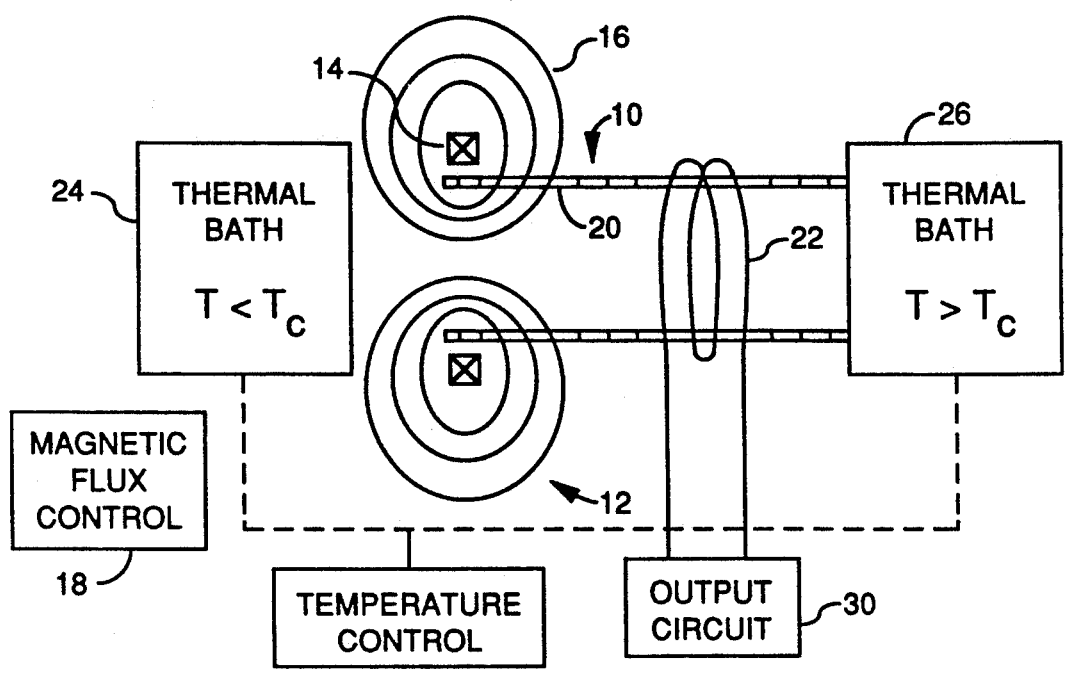
FIG. 1A illustrates the present invention in its non superconducting state.

Referring to FIG. 1A, a hollow tube 10, shown in cross section, is made of superconducting material of Type I or II, preferably of Type II. The tube should be preferably longer than its diameter for reasons noted below.

About one end 12 of the tube 10 is located a source 14 of magnetic flux 16. The source 14 may be a permanent magnetic or electrical coils. A means for magnetic flux control 18 may be a controlled current source. The source 14 should be located such that only one side of the symmetrical magnetic flux intercepts a wall 20 of the tube 10.

A pick-up coil 22 is located distally from the source 14 on the tube 10.

In order for the flux 16 to cut the coil 22, a means for progressively changing the superconducting state of the tube 10 is disclosed hereinbelow.

The temperature of the tube 10 is controlled by contact with one or another thermal bath 24 or 26 having a temperature less than or greater than the critical temperature Tc. The thermal baths may be connected to a temperature control means 28 such as a mechanical stage for movement. The temperature control means 28 may also be a set of cylindrical coils wrapped about the exterior of tube 10 and connected to thermal baths. Cooling or heating fluid would be pumped back and forth as appropriate to switch the superconducting state of the tube 10.

Figure 1B:
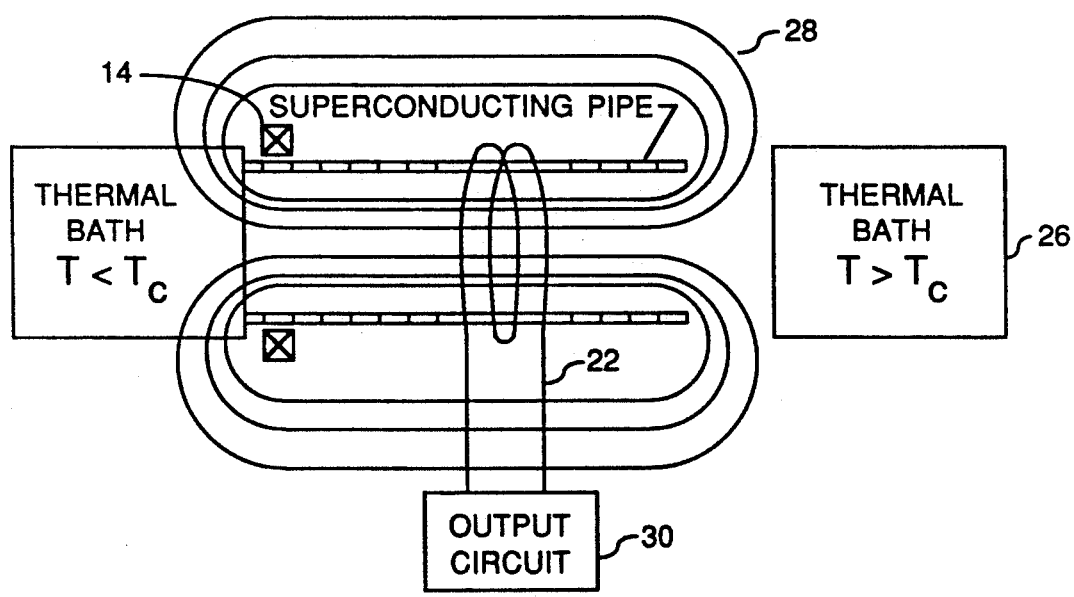
FIG. 1B illustrates the present invention in its superconducting state.

As the cool thermal bath 24 contacts the tube 10, the superconducting stage proceeds left to right. Due to the Meissner effect, the magnetic field is pushed left to right resulting in the state shown in FIG. 1B. The magnetic flux 28 is now trapped inside the tube 10. As the lower temperature which causes the superconducting phase transition moves along the tube 10, the magnetic flux threading the tube 10 at the location corresponding to the interface between the phases is constant. Thus, energy is added to the field. This energy comes from the free energy of the superconducting phase transition. The amount of flux is limited by the critical field of the Type II superconductors.

The pickup coils 22 placed in the changing magnetic field will have an electrical impulse induced in it because of the time changing magnetic flux threading the coil 22. The coils 22 feed an output circuit 30. The configuration of the output circuit 30 can be changed in order to optimize the electrical waveform output by this device. Another pulse of electricity will be included in the output circuit 30 when the tube 10 is heated so that it transitions back to the normal state as seen in FIG. 1A. A thermodynamic cycle can therefore drive this device to convert thermal energy into electricity.

Figure 2:
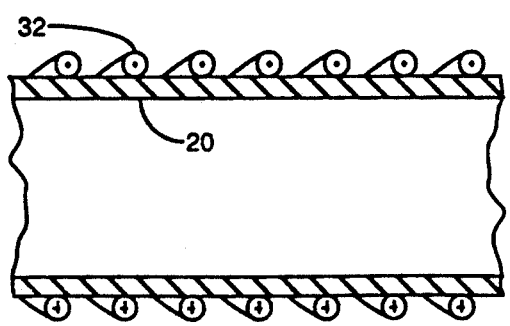
FIG. 2 illustrates a means for cooling the present invention to cause a switch of states.

The speed of changing states is primarily determined by how fast the cooling fluid contacts the tube 10. As noted above, a cylindrical set of coils 32, FIG. 2, in intimate contact with the walls 20 are one possible means to cool/heat the tube 10. The fluid input would be controlled by valves and pumps, or, the cooling fluid could rise bottom to top if the tube 10 is in a vertical position. Again, the fluid control would be by valves and pumps.

Clearly, many modifications and variations of the present invention are possible in light of the above teachings and it is therefore understood, that within the inventive scope of the inventive concept, the invention may be practiced otherwise than specifically claimed.

What is claimed is:

1. An apparatus to produce electrical impulses, said apparatus comprising:
   a tube, said tube composed of superconducting material;
   a source of magnetic flux, said source located at an end of said tube, said source located about said end;
   means for intercepting magnetic flux from said source of magnetic flux, said means for intercepting magnetic flux being able to output an electrical impulse; and
   means for progressively changing the superconducting state of said tube, said means for progressively changing having a temperature control means, a temperature lower than a critical temperature being selectively applied to said end having said source, and a temperature greater than said critical temperature being applied opposite to said source.

2. An apparatus as defined in claim 1 wherein said tube is composed of a Type I or Type II superconducting compound.

3. An apparatus as defined in claim 1 wherein said tube is substantially longer than its diameter.

4. An apparatus as defined in claim 1 wherein said source of magnetic flux is provided by a permanent magnet.

5. An apparatus as defined in claim 1 wherein said source of magnetic flux is provided by coils driven by magnetic flux control circuit.

6. An apparatus as defined by claim 1 wherein said means for intercepting said magnetic flux comprises a pickup coil and an output circuit.

7. An apparatus as defined in claim 1 wherein said means for progressively changing comprises a pair of thermal baths for selective contact with said tube.

8. An apparatus as defined in claim 1 wherein said means for progressively changing comprises a fluid bath which selectively translates a cooling fluid vertically along said tube to cause a superconducting state.

9. An apparatus as defined in claim 1 wherein said means for progressively changing comprises a pair of thermal baths, said thermal baths connected by coils wrapped intimately about said tube.

* * * * *